United States Patent [19]

Yamamoto et al.

[11] Patent Number: 5,241,018

[45] Date of Patent: Aug. 31, 1993

[54] TERMINAL-MODIFIED IMIDE OLIGOMER COMPOSITION

[75] Inventors: Shinji Yamamoto; Yasuo Hirano; Kazuyoshi Fujii, all of Osaka, Japan

[73] Assignee: Ube Industries, Ltd., Yamaguchi, Japan

[21] Appl. No.: 894,585

[22] Filed: Jun. 5, 1992

[30] Foreign Application Priority Data

Jun. 7, 1991 [JP] Japan .................................. 3-232597

[51] Int. Cl.⁵ .................................. C08G 69/26
[52] U.S. Cl. .................................. 525/426; 525/432; 528/125; 528/128; 528/170; 528/171; 528/172; 528/173; 528/188; 528/220; 528/229; 528/310; 528/322; 528/328; 528/351; 528/353
[58] Field of Search ............... 528/351, 171, 229, 353, 528/125, 128, 170, 172, 173, 188, 220, 310, 322, 328; 525/426, 432

[56] References Cited

U.S. PATENT DOCUMENTS

| | | | |
|---|---|---|---|
| 5,081,196 | 1/1992 | Yamamoto et al. | 525/419 |
| 5,128,444 | 7/1992 | Inoue et al. | 525/353 |

FOREIGN PATENT DOCUMENTS

| | | |
|---|---|---|
| 0304913 | 3/1989 | European Pat. Off. . |
| 0371154A1 | 6/1990 | European Pat. Off. . |
| 0357367A3 | 7/1990 | European Pat. Off. . |
| 0393638A2 | 10/1990 | European Pat. Off. . |
| 0395020A2 | 10/1990 | European Pat. Off. . |
| 0420593 | 3/1991 | European Pat. Off. . |
| 1-139632 | 6/1989 | Japan . |
| 1-247430 | 10/1989 | Japan . |
| 2-64136 | 3/1990 | Japan . |
| 2-284923 | 11/1990 | Japan . |

OTHER PUBLICATIONS

European Search Report.

*Primary Examiner*—John Kight, III
*Assistant Examiner*—John M. Cooney, Jr.
*Attorney, Agent, or Firm*—Finnegan, Henderson, Farabow, Garrett & Dunner

[57] ABSTRACT

The terminal-modified imide oligomer composition capable of being cured within a short time and of being converted to a shaped, cured resin article having a high mechanical strength, heat resistance and elastic modulus, comprises a rigid, high molecular weight aromatic polyimide (I) produced by polymerizing and imidizing a tetracarboxylic acid component comprising at least one biphenyltetracarboxylic acid compound with an amine component comprising at least one aromatic diamine compound (a) having at least one cyclic structure and two amino groups directly attached to the cyclic structure; a flexible imide oligomer (II) produced by polymerizing and imidizing the tetracarboxylic acid component, with a diamine component comprising at least one aromatic diamine compound (b) having at least two cyclic structures and two amino groups attached directly or through a divalent bonding member to the cyclic structures and a monoamine component comprising at least one monoamine compound (c) having an unsaturated hydrocarbon group; a reactive monomer (III) having a unsaturated hydrocarbon group; and optionally, a rigid, terminal-modified imide oligomer (IV) produced by polymerizing and imidizing the tetracaboxylic acid component with the diamine component (a) and the monoamine component (c), and is usable as a heat resistant bonding material, matrix resin of composite material and resin composition for shaped articles, and thus useful for producing aircraft and machines or devices for the space industry.

14 Claims, No Drawings

TERMINAL-MODIFIED IMIDE OLIGOMER COMPOSITION

BACKGROUND OF THE INVENTION

1. Field of the Invention

The present invention relates to a terminal-modified imide oligomer composition. More particularly, the present invention relates to a terminal-modified imide oligomer composition capable of being easily cured within a relatively short time to produce a cured article having a high mechanical strength, elastic modulus and an excellent heat resistance, especially a high mechanical strength and elastic modulus at a high temperature, and thus usable for producing various heat resistant bonding materials, matrix resins of composite industrial materials containing various reinforcing materials and/or fillers and resins for molding, which materials or resins are useful in very wide applications to, for example, aircraft, space-industrial machines or devices, and vehicle-industrial machines and devices.

2. Description of the Related Art

It is known that thermosetting resins comprising as a major component, a terminal-modified imide oligomer having a relatively low molecular weight, have a higher heat resistance than that of conventional thermoplastic resins, and thus are usable as a matrix resin component of shaped articles or fiber-reinforced composite materials.

Recently, several types of addition curing polyimide resins (imide oligomers) prepared by a polymerization of, for example, pyromellitic dianhydride with an aromatic diamine and an unsaturated reactive compound and having unsaturated terminal radials, have been provided as a matrix resin for prepregs. Almost all of the conventional imide oligomer resins are disadvantageous in that the resins must be prepared by using a specific diamine compound, which is expensive and difficult to obtain, the imide oligomer resins exhibit a low solubility in an organic solvents, and thus are difficult to impregnate in a reinforcing fiber material, a specific organic solvent must be used to prepare the imide oligomer resins, or the imide oligomer resins exhibit a too high melting point, and thus can be converted to shaped articles only at a very high shaping temperature, and this high temperature causes the resultant shaped article to be deteriorated.

Further, the conventional imide oligomer resins do not always have satisfactory curing performances, and thus a too long gelation time of the resin is needed, or the imide oligomer resins have unreacted cross-linking terminal radicals, and therefore, when a composite material is prepared by using the imide oligomer resins, the resultant cured material exhibits a mechanical strength and elastic modulus lower than those expected in view of the chemical structures of the resin.

Furthermore, the conventional imide oligomer resins are disadvantageous in that, when reinforced with fibers, the affinity of the conventional imide oligomer resins to the reinforcing fibers is not satisfactory, and thus in a resultant fiber-reinforced resin articles, the reinforcing fibers are peeled from the resin matrix at the interface therebetween.

Japanese Unexamined Patent Publication (JP-A) Nos. 1-139,632, 1-247,430, 2-64,136, and 2-284,923 disclose several attempts to obtain improved terminal-modified imide oligomer resins able to effectively eliminate some of the above-mentioned disadvantages.

Namely, JP-A-1-139,632 discloses a terminal-modified imide oligomer which is a reaction product of (a) a biphenyltetracarboxylic acid compound with (b) an aromatic diamine and (c) an unsaturated monoamine. This terminal-modified imide oligomer exhibits a high solubility in organic solvents and a relatively low melting point and is useful for providing fiber-reinforced prepregs.

JP-A-1-247,430 discloses a terminal-modified imide oligomer produced by reacting (a) a biphenyl-tetracarboxylic acid compound with (b) an aromatic diamine and (c) a monoamine compound having a carbon-carbon triple bond and having a boiling point of 150° C. to 190° C. under the ambient atmospheric pressure, a vaporization heat of 11 to 16 kcal/mol at a temperature of 25° C., and a vapor pressure of 3 mmHg or less at a temperature of 25° C. This terminal-modified imide oligomer has a high solubility in organic solvents and a relatively low melting point, and thus is useful for producing a fiber-reinforced prepreg.

JP-A-2-64,136 discloses organic fibers produced from a biphenytetracarboxylic acid compound and an aromatic diamine. The organic fibers are useful as reinforcing fibers for a thermosetting resin prepregs.

JP-A-2-284,923 discloses a terminal-modified imide polymer composition usable as a bonding material or a matrix resin of composite materials. The composition comprises at least one flexible terminal-modified imide oligomer (A) selected from (1) terminal-modified imide oligomers produced by reacting biphenyltetracarboxylic acid compounds with aromatic diamine compounds (a) in which a plurality of aromatic cyclic groups are connected to each other directly or through a divalent bonding member consisting of one to 3 atoms and a monoamine compound or carboxylic acid compound having an unsaturated group, and (II) a terminal-modified imide oligomers produced by reacting biphenyltetracarboxylic acid compounds with monoamine compounds having an unsaturated group, and at least one rigid terminal-modified imide oligomer B selected from (III) terminal-modified imide oligomers produced by reacting biphenyltetracarboxylic acid compounds with aromatic diamine compound (b) having a mono-cyclic structure or a polycyclic structure, and a monoamine or carboxylic acid compound having an unsaturated group, and (IV) terminal-modified imide oligomers produced by reacting pyromellitic acid compounds with aromatic diamine compound (c) and monoamine or carboxylic acid compound having an unsaturated group. This terminal-modified imide oligomer is useful for producing cured articles having a high heat resistance, mechanical strength, and elastic modulus.

Nevertheless, the prior arts disclosed in the above-mentioned publications are successful in eliminating only some of the above-mentioned advantages, and the cured materials produced from these imide oligomer resins still have an unsatisfactory mechanical performance and elastic modulus.

Therefore, from the view point of practical use, the conventional imide oligomer resins must be further improved, to eliminate all of the above-mentioned disadvantages.

Accordingly, in the technical field of the shaped resin articles and fiber-reinforced composite materials, the provision of imide oligomer resins satisfying all of the requirements for a high shapability (formability), heat resistance at a high temperature, mechanical strength, and elastic modulus is urgently required.

SUMMARY OF THE INVENTION

An object of the present invention is to provide a terminal-modified imide oligomer composition having a high curing performance and useful for producing shaped articles or matrix resins of reinforced composite materials having an excellent heat resistance, mechanical strength and elastic modulus at a high temperature.

Another object of the present invention is to provide a terminal-modified imide oligomer composition capable of firmly bonding synthetic fibers to each other therethrough at a relatively low temperature within a relatively short curing time.

The above-mentioned objects can be attained by the terminal-modified imide oligomer composition of the present invention, which comprises:

(I) 100 parts by weight of a rigid, high molecular weight aromatic polyimide consisting of a polymerization and imidization product of a tetracarboxylic acid component comprising at least one biphenyltetracarboxylic acid compound with an amine component comprising at least one aromatic diamine (a) having at least one cyclic structure and two amino groups directly attached to the cyclic structure, this polyimide (I) having a logarithmic viscosity number of from 0.20 to 1.5 determined in a concentration of 0.5 g/100 ml in a solvent consisting of N-methyl-2-pyrrolidone at a temperature of 30° C.;

(II) 20 to 200 parts by weight of a flexible, terminal-modified imide oligomer consisting of a polymerization and imidization product of a tetracarboxylic acid component comprising at least one biphenyltetracarboxylic acid compound with a diamine component comprising at least one aromatic diamine compound (b) having a plurality of cyclic structures and two amino groups attached directly or through a divalent bonding member to the cyclic structures, and with a monoamine component comprising at least one monoamine compound (c) having a primary amino group and an unsaturated hydrocarbon group, this imide oligomer (II) being provided with unsaturated hydrocarbon groups located at the terminals of the imide oligomer molecule and imide groups located in an inside portion of the oligomer molecule and having a logarithmic viscosity number of 0.01 to 0.18 determined in the same manner as mentioned above;

(III) 20 to 250 parts by weight of a reactive monomer provided with at least one unsaturated hydrocarbon group and having a number average molecular weight of 50 to 500; and (IV) 0 to 200 parts by weight of a rigid, terminal-modified imide oligomer consisting-of a polymerization and imidization product of a tetracarboxylic acid component comprising at least one biphenyltetracarboxylic acid compound with a diamine component comprising at least one aromatic diamine compound (a) having at least one cyclic structure and two amino groups directly attached to the cyclic structure and with a monoamine component comprising at least one monoamine compound (c) having at least one unsaturated hydrocarbon group, this rigid oligomer (IV) being provided with unsaturated hydrocarbon groups located at the terminals of the oligomer molecule and imide groups located in an inside portion of the oligomer molecule and has a logarithmic viscosity number of 0.01 to 0.18 determined in the same manner as mentioned above.

In an embodiment of the present invention, the rigid, high molecular weight aromatic polyimide (I) is preferably a rigid, terminal-modified imide macromer (Ia) which is a polymerization-imidization product of a tetracarboxylic acid component comprising at least one biphenyltetracarboxylic acid compound with an amine component comprising at least one aromatic diamine compound (a) having at least one cyclic structure and at least two amino groups directly attached to the cyclic structure and at least one monoamine compound (c) having at least one unsaturated hydrocarbon group, this imide macromer being provided with unsaturated hydrocarbon groups located at the terminals of the macromer molecule and imide groups located in the middle of the macromer molecule, and having a logarithmic viscosity number of 0.20 to 1.0 determined in the same manner as mentioned above.

DESCRIPTION OF THE PREFERRED EMBODIMENTS

The terminal-modified imide oligomer composition of the present invention is characterized by the combination of:

100 parts of weight of a rigid, high molecular weight aromatic polyimide (I), with 20 to 200 parts by weight of a flexible, terminal-modified imide oligomer (II), 20 to 200 parts by weight of a reactive monomer (III), and 0 to 200 parts by weight of a rigid terminal-modified imide oligomer (IV).

The above-mentioned specific combination of the aromatic polyimide (I) with the flexible imide oligomer (II), the reactive monomer (III) and the rigid imide oligomer (IV) effectively causes the resultant imide oligomer composition to exhibit an enhanced curing performance and the resultant cured resin material to exhibit an excellent heat resistance, and a superior mechanical strength and elastic modulus.

The rigid high molecular weight aromatic polyimide (I) consists of a polymerization and imidization product of a tetracarboxylic acid component comprising at least one biphenyltetracarboxylic acid compound with an amine component comprising, as a main ingredient thereof, at least one aromatic diamine (a) having at least one cyclic structure and two amino groups directly attached to the cyclic structure. Also, the rigid, high molecular weight aromatic polyimide (I) has a high logarithmic viscosity number of from 0.20 to 1.5, preferably 0.22 to 1.0, determined in a concentration of 0.5 g/100 ml in a solvent consisting of N-methyl-2-pyrrolidone at a temperature of 30° C.

If the logarithmic viscosity number of the aromatic polyimide (I) is less than 0.20, the resultant composition is disadvantageous in that the resultant imide oligomer composition exhibits a too low melt viscosity, and thus a poor formability(moldability), and the resultant cured resin material exhibits an unsatisfactory heat resistance.

If the logarithmic viscosity number of the aromatic polyimide is more than 2.0, the resultant composition is disadvantageous in that the resultant imide oligomer composition exhibits an desirable high melt viscosity, and thus an undesirable low formability(moldability), and the resultant cured resin material exhibits a poor mechanical strength and a high fragility.

As mentioned above, the aromatic polyimide (I) is preferably a rigid, terminal-modified imide macromer (Ia). This imide macromer (Ia) is a polymerization and imidization product of a tetracarboxylic acid component comprising at least one biphenyltetracarboxylic acid compound with an amine component comprising a diamine sub-component comprising at least one diamine compound (a) as defined above and a monoamine sub-component comprising at least one monoamine compound (c) as defined above. The macromer (Ia) is provided with unsaturated hydrocarbon groups derived from the monoamine compound (c) and located at the terminals of the macromer molecule and imide groups located in the middle of the macromer molecule. Also, the macromer (Ia) has a high logarithmic viscosity of 0.20 to 1.0 determined in the above-mentioned manner.

In the imide oligomer composition of the present invention, the flexible, terminal-modified imide oligomer (II) is contained in an amount of 20 to 200 parts by weight, preferably 30 to 180 parts by weight, per 100 parts by weight of the aromatic polyimide (I). If the amount of the imide oligomer (II) is less than 20 parts, the resultant composition is disadvantageous in that the resultant imide oligomer composition exhibits an undesirable high melt viscosity, and thus an undesirable low formability (moldability) and the resultant cured resin material exhibits a poor mechanical strength and a high fragility. Also, if the amount of the imide oligomer (II) is more than 200 parts by weight, the resultant composition is disadvantageous in that the resultant cured resin material exhibits an undesirably low glass-transition temperature.

The imide oligomer (II) consists of a polymerization and imidization product of a tetracarboxylic acid component comprising at least one biphenyltetracarboxylic acid compound with a diamine component comprising at least one aromatic diamine compound (b) having a plurality of cyclic structures and two amine groups attached directly or through a divalent bonding member to the cyclic structures, and with a monoamine component comprising at least one monoamine compound having a primary amine group and an unsaturated hydrocarbon group.

The imide oligomer (II) is provided with unsaturated hydrocarbon groups derived from the specific monoamine compound (c) and located at the terminals of the imide oligomer molecule and imide groups located in an inside portion of the oligomer molecule.

The imide oligomer (II) has a logarithmic viscosity number of 0.01 to 0.18 determined in the above-mentioned manner. If the logarithmic viscosity number of the imide oligomer (II) is less than 0.01, the resultant composition is disadvantageous in that the resultant cured resin material exhibits a poor mechanical strength and a high fragility. Also, if the logarithmic viscosity number of the imide oligomer is more than 0.18, the resultant composition is disadvantageous in that the resultant cured resin material exhibits an undesirably low glass-transition temperature.

The unsaturated hydrocarbon group of the monoamine compound is preferably selected from ethylenically unsaturated hydrocarbon groups

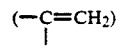

and acetylenically unsaturated hydrocarbon groups (—C≡CH).

In the terminal-modified imide oligomer composition of the present invention, the reactive monomer (III) is present in an amount of 20 to 250 parts by weight, preferably 50 to 200 parts by weight, per 100 parts by weight of the aromatic polyimide (I). When the amount of the reactive monomer (III) is less than 20 parts by weight, the resultant imide oligomer composition is disadvantageous in that the resultant imide oligomer composition exhibits an undesirably high melt viscosity, and thus a poor formability (moldability), and the resultant prepreg prepared from the imide oligomer composition exhibits a poor tacking property. If the reactive monomer (III) content is more than 250 parts by weight, the resultant imide oligomer composition is disadvantageous in that the resultant imide oligomer composition exhibits a too low melt viscosity, and thus a poor formability (moldability), and the resultant cured resin material exhibits an undesirably low glass-transition temperature and an unsatisfactory heat resistance. The reactive monomer (III) is provided with at least one unsaturated hydrocarbon group, for example, ethylenically unsaturated hydrocarbon group or acetylenically unsaturated hydrocarbon group, having a high reactivity.

Also, the reactive monomer (III) has a number average molecular weight of 50 to 500. If the molecular weight is less than 50, the resultant imide oligomer composition is disadvantageous in that the resultant imide oligomer composition exhibits a too low melt viscosity, and thus a poor formability(moldability), and the resultant cured resin material exhibits an undesirably low glass-transition temperature and an unsatisfactory heat resistance, and if the molecular weight is more than 500, the resultant imide oligomer composition is disadvantageous in that the resultant imide oligomer composition exhibits an undesirably high melt viscosity, and thus a poor formability(moldability), and the resultant prepreg prepared from the imide oligomer composition exhibits a poor tacking property.

In the terminal-modified imide oligomer composition of the present invention, the rigid, terminal-modified imide oligomer (IV) effectively causes the resultant imide oligomer composition to exhibit an excellent heat resistance and superior mechanical strength and elastic modulus.

The imide oligomer (IV) is present in an amount of 0 to 200 parts by weight, preferably 0 to 180 parts by weight, more preferably 20 to 200 parts by weight, still more preferably 30 to 180 parts by weight, per 100 parts by weight of the aromatic polyimide (I). If the content of the imide oligomer (IV) is more than 200 parts by weight, the resultant imide oligomer composition is sometimes disadvantageous in that the resultant imide oligomer composition exhibits an undesirable high melt viscosity, and thus an undesirable low formability (moldability), and the resultant cured resin material exhibits a poor mechanical strength and a high fragility.

The imide oligomer (IV) is a polymerization and imidization product of a tetracarboxylic acid component comprising at least one biphenyltetracarboxylic acid compound with a diamine component comprising at least one aromatic diamine compound (a) having at least one cyclic structure and two amine groups directly attached to the cyclic structure and with a monoamine component comprising at least one monoamine compound (c) having at least one unsaturated hydrocarbon group. Thus, the imide oligomer (IV) is provided with unsaturated hydrocarbon groups located at the terminals of the imide oligomer (IV) molecule and imide groups located in an inside portion of the imide oligomer (IV) molecule. Also, the imide oligomer (IV) has a low logarithmic viscosity number of 0.01 to 0.18 determined in the above-mentioned manner. If the logarithmic viscosity number is less than 0.01, the resultant imide oligomer composition is sometimes disadvantageous in that the resultant imide oligomer composition exhibits an undesirable high melt viscosity, and thus an undesirable low formability (moldability), and the resultant cured resin material exhibits a poor mechanical strength and a high fragility, and if it is more than 0.18, the resultant imide oligomer composition is sometimes disadvantageous in that the resultant cured resin material is very brittle and has a poor mechanical strength.

In the rigid aromatic polyimide (I), the macromer (Ia), the flexible imide oligomer (II) and the rigid imide oligomer (IV), the tetracarboxylic acid component preferably comprises 60 to 100% by mole, more preferably 80 to 100% by mole, of at least one biphenyltetracarboxylic acid component and 0 to 40% by mole, more preferably 0 to 20% by mole, of at least one other tetracarboxylic acid compound than the above-mentioned biphenyltetracarboxylic acid compound.

The biphenyltetracarboxylic acid compound is selected from 3,3',4,4'-biphenyltetracarboxylic acid, 2,3,3',4'-biphenyltetracarboxylic acid and dianhydrides, lower alkyl esters and salts of the above-mentioned acids.

The preferable biphenyltetracarboxylic acid compound is 2,3,3',4'-biphenyltetracarboxylic dianhydride.

The other tetracarboxylic acid compound is preferably selected from 3,3',4,4'-biphenyltetracarboxylic acid and dianhydrides, esters and salts thereof.

In the aromatic polyimide (I), the amine component preferably comprises 60 to 100% by mole, more preferably 80 to 100% by mole, of at least one aromatic diamine compound (a) having at least one cyclic structure and two amine groups directly attached to the cyclic structure and 0 to 40% by mole, more preferably 0 to 20% by mole, of at least one amine compound other than the aromatic diamine compound (a). In the imide macromer (Ia), the monoamine compound (c) having at least one unsaturated hydrocarbon group corresponds to the other amine compound of the aromatic polyimide (I).

The aromatic diamine compound (a) usable for the aromatic polyimide (I), the imide macromer (Ia) and the rigid imide oligomer (IV), has one or more cyclic structures and two amine groups attached directly to the cyclic structures. Where the aromatic diamine compound (a) has two or more cyclic structures, they are bonded to each other directly or through a divalent bonding member, for example, —O—, —S—, —SO—, —SO$_2$—, —CO—, or —CH$_2$—, which has 1 to 3 atoms.

The cyclic structure of the aromatic diamine compound (a) is preferably selected from aromatic cyclic structures, for example, naphthalene, anthracene and tolidine ring structures, and heterocyclic structures, for example, thiazole, pyridine and furan ring structures. Preferably, the aromatic diamine compound (a) has a condensed ring structure or a polycyclic structure.

Preferably, the aromatic diamine compound (a) is selected from the group consisting of diaminodiphenylenesulfone compounds, for example, 3,7-diaminodiphenylsulfone, and 2,8-dimethyl-3,7-diaminodiphenylsulfone (namely orthotolidinesulfone), and diaminoheterocyclic compounds, for example, 2,2'-diaminobisthiazole.

The aromatic diamine compound (b) usable for the flexible, terminal-modified imide oligomer (II) has a plurality of cyclic structures and two amino groups attached directly or through a divalent bonding member having one to three atoms, to the cyclic structures. The cyclic structures are preferably selected from aromatic cyclic structures, for example, benzene, naphthalene, anthracene and fluorene ring structures, and heterocyclic structures, for example, thiazole, pyridine, imidazole and oxazole ring structures.

The divalent bonding member is preferably selected from —O—, —S—, —SO—, —CO—, —SO$_2$— and —CH$_2$—.

The aromatic diamine compound (b) is preferably selected from the group consisting of benzidine compounds, for example, 3,3'-dimethoxybenzidine and 3,3-diethylbenzidine; diaminodiphenylether compounds, for example, 4,4'-diaminodiphenylether, 3,3'-diaminodiphenylether and 3,4'-diaminodiphenylether; diaminodiphenylmethane compounds, for example, 4,4'-diaminodiphenylmethane and 3,3'-diaminodiphenylmethane; diaminodiphenylsulfone compounds, for example, 4,4'-diaminodiphenylsulfone and 3,3'-diaminodiphenylsulfone; bis(aminophenoxy)benzene compounds, for example, 1,4-bis(4-aminophenoxy)benzene and 1,3-bis(3-aminophenoxy) benzene; bis[(aminophenoxy)phenyl]propane, for example, 2,2-bis[4-(4-aminophenoxy)phenyl]propane, 2,2-bis[4-(3aminophenoxy)phenyl]propane, and 2,2-bis[4-(4aminophenoxy)phenyl]hexafluoropropane; bis[(aminophenoxy)phenyl]sulfone compounds, for example, bis[4-(4-aminophenoxy)phenyl]sulfone and bis[4-(3aminophenoxy)phenyl]sulfone; and heterocyclic diamine compounds, for example, 2,5-bis(m-aminophenyl)-1,3,4-oxadiazole, 2,2'-bis(m-aminophenyl)benzobisthiazole and 2,2'-bis(m-aminophenyl)benzobisoxazole.

The monoamine compound (c) usable for the rigid imide macromer (Ia), the flexible imide oligomer (II) and the rigid imide oligomer (IV), has an unsaturated hydrocarbon group, for example, ethylenically or acetylenically unsaturated hydrocarbon group and a primary amine group, and thus is able to react with the carboxylic acid groups of the tetracarboxylic acid compound to form an imide group.

The monoamino compound (c) having the unsaturated hydrocarbon group, preferably acetylenically unsaturated hydrocarbon group effectively causes the resultant aromatic imide macromer (Ia), flexible imide oligomer (II) and rigid imide oligomer (IV) to exhibit an enhanced reactivity and the resultant imide oligomer composition to exhibit an improved curing performance.

The monoamine compound (c) is preferably selected from the group consisting of aliphatic unsaturated monoamine compounds having 3 to 8 carbon atoms propargylamine (PA), 3-aminobutyne, 5-aminopentyne, 6-aminohexyne, 7-aminoheptyne, 4-amino-3-methylbutyne, and 4-aminopentyne; and aromatic manoamine compounds, for example, 3-aminophenylacetylene and 4-aminophenyl acetylene.

The monoamine component for the flexible imide oligomer (II), the rigid imide oligomer (IV) or the imide macromer (Ia) comprises one or two or more of the monoamine compounds (c).

The reactive monomer (III) provided with at least one unsaturated hydrocarbon group is preferably selected from acetylenically unsaturated monomers, for example, 9,10-bis(phenylethynyl)antracene, 5,12bis(phenylethynyl)naphthacene, 5-phenyl-2-(2-propynylamino)oxazoline-4-one, triallylisocyanurate, and diallylphthalate; and unsaturated imide compounds produced by reacting a dicarboxylic acid compound with a monoamine compound having a unsaturated hydrocarbon group, for example, N-propargyl phthalimide, N-propargyl nadimide and N-propargyl methylnadimide.

The N-propargyl nadimide is of the formula:

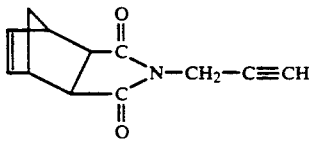

In an embodiment of the imide oligomer composition of the present invention, the rigid, high molecular weight aromatic polyimide (I) comprises 60 to 100 molar %, preferably 80 to 100 molar %, of the recurring units of the formula (Ix):

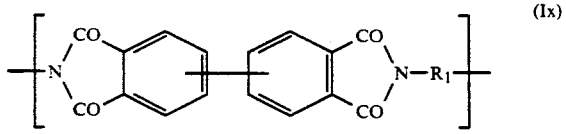

wherein $R_1$ represents a divalent residue of the aromatic diamine compound (a), 0 to 40 molar %, preferably 0 to 20 molar %, of recurring units of the formula (Iy):

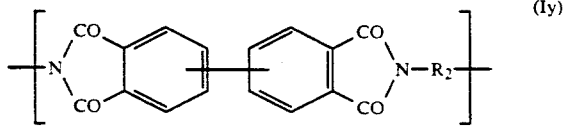

wherein $R_2$ is a divalent residue of the aromatic diamine compound other than the aromatic diamine compound (a), and 0 to 20 molar %, preferably 0 to 10 molar %, of recurring units of the formula (Iz):

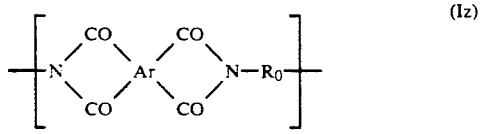

wherein Ar represents a tetravalent residue of an aromatic tetracarboxylic acid compound different from the biphenyltetracarboxylic acid compound and $R_0$ represents a divalent residue of an aromatic diamine compound.

The divalent residue represented by R is the same as either the residue represented by $R_1$ or the residue represented by $R_2$.

The above-mentioned rigid, high molecular weight aromatic polyimide (I) has a high lagarithmic viscosity number of 0.20 to 1.5, preferably 0.22 to 1.0, determined in the above-mentioned manner.

In an embodiment of the imide macromer (Ia), the amine component preferably comprises 30 to 60 molar % of a diamine sub-component comprising at least one aromatic diamine compound (a) and 0.5 to 10 molar % of the monoamine sub-component comprising at least one unsaturated monoamine compound (c) having a primary amino group and an unsaturated hydrocarbon group, namely, ethylenically or acetylenically unsaturated hydrocarbon group. The monoamine sub-component may contain a monoamine compound not having the unsaturated hydrocarbon group, in an amount of 0 to 10 molar % based on the total molar amount of the unsaturated monoamine compound and the saturated monoamine compound. This imide macromer (Ia) has a logarithmic viscosity number of 0.20 to 1.0, preferably 0.22 to 1.0, determined in the above-mentioned manner.

In this imide macromer (Ia), preferably the monoamine sub-component is used in an amount of 1 to 20 molar %, more preferably 2 to 15 molar %, based on the molar amount of the tetracarboxylic acid component, and the total carboxylic equivalent of the tetracarboxylic acid component is approximately equal to the total amino equivalent of the diamine sub-component and the monoamine sub-component. The resultant imide macromer (Ia) preferably has a degree of polymerization of the recurring units derived from tetracarboxylic acid component with the diamine sub-component, of 10 to 100, more preferably 15 to 50.

A preferable embodiment of the imide macromer (Ia) comprises 60 to 100 molar %, more preferably 80 to 100 molar % of the recurring units of the formula (Ix), 0 to 40 molar %, more preferably 0 to 20 molar %, of the recurring units of the formula (Iy), 0 to 20 molar %, more preferably 0 to 10 molar %, of the recurring units of the formula (Iz), provided with terminal unsaturated hydrocarbon groups derived from the unsaturated monoamine compound (c), and has a logarithmic viscosity number of 0.20 to 1.0, more preferably 0.22 to 1.0, and a degree of polymerization of 10 to 100. This imide macromer is soluble in organic solvents and is rigid.

The rigid, high molecular weight aromatic polyimide (I) or imide macromer (Ia) has a degree of imidization of 95% or more, preferably 96 to 100%, determined by a customary infra-red absorption spectrum analysis method and thus is substantially free from an amide acid bond structure.

The aromatic imide polyamide (I) has a melting or softening point of 180° C. to 350° C., preferably 200 to 280° C., and can be uniformly dissolved in a concentration of 3.0% by weight or more, preferably from 5 to 30% by weight in an organic polar solvent, for example, N-methyl-2-pyrrolidone.

The rigid imide macromer (Ia) preferably has a melting point of 150° C. to 300° C., more preferably 180° C. to 280° C. and is in the state of solid powder at room temperature.

The flexible, terminal-modified imide oligomer (II) usable for the present invention, is prepared by a polymerization and imidization reaction of the tetracarboxylic acid component with the diamine component, which preferably comprises 80 molar % or more, more preferably 90 to 100 molar %, of at least one aromatic diamine compound (b) having a plurality of cyclic group, preferably aromatic cyclic hydrocarbon groups and/or heterocyclic groups, bonded directly or through a divalent bonding member to each other, and two amino groups directly attached to the cyclic groups, and with the monoamine component comprising at least one monoamine component (c) having an amino group and an unsaturated hydrocarbon group such as

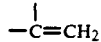

or —C≡CH group, and thus is provided with unsaturated hydrocarbon groups derived from the unsaturated monoamine compound (c) and located at the terminals of the oligomer (II) molecule and imide groups located in an inside portion of the molecule. The imide oligomer (II) has a low logarithmic viscosity number of 0.01 to 0.18 determined in the above-mentioned manner.

The flexible, terminal-modified imide oligomer (II) preferably comprises 60 to 100 molar %, more preferably 80 to 100 molar %, of at least one member selected from the group consisting of recurring units of the formula (IIx) and (IIy):

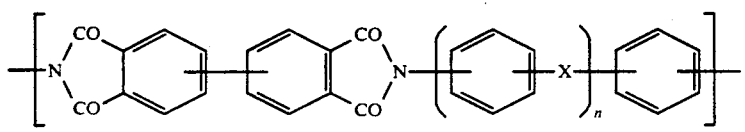

(IIx)

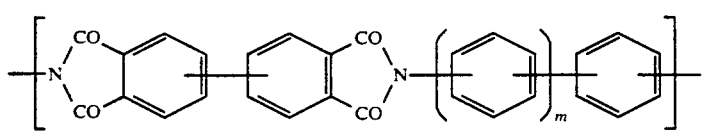

(IIy)

wherein X represents a divalent bonding member selected from the group consisting of —O—, —S—, —SO—, —CO—, —SO$_2$— and —CH$_2$—, n and m respectively and independently from each other represent an integer of 1 to 3, 0 to 40 molar %, more preferably 0 to 20 molar %, of recurring units of the formula (IIz):

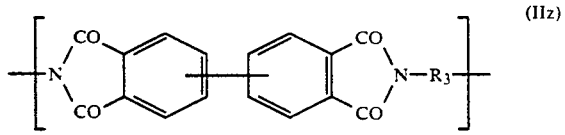

(IIz)

wherein R$_3$ represents a divalent residue of the aromatic diamine compound (b), which is different from

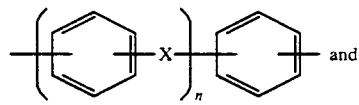

and

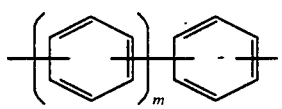

and 0 to 20 molar %, more preferably 0 to 10 molar %, of recurring units of the formula (IIw):

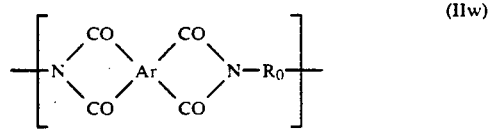

(IIw)

wherein Ar and R$_0$ are as defined above, and is provided with unsaturated terminal hydrocarbon groups derived from the unsaturated hydrocarbon group of the monoamine compound (c), and located at the terminals of the oligomer molecule. This imide oligomer (II) must have a logarithmic viscosity number of 0.01 to 0.18 determined in the above-mentioned manner.

The imide oligomer (II) preferably has a degree of imidization of 95% or more, more preferably 96 to 100%, determined by a customary method, for example, an infrared absorption spectrum analysis method, and this is substantially free from an amide acid bond structure. The imide oligomer (III) can be uniformly dissolved in a concentration of 3% by weight or more, more preferably 5 to 30% by weight, in an organic polar solvent, for example, N-methyl-2-pyrrolidone.

Also, the flexible, terminal-modified imide oligomer (II) preferably has a melting point of 100° C. to 300° C., more preferably 150° C. to 270° C. and is in the state of

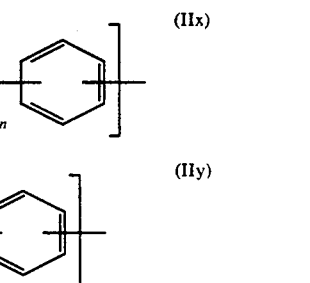

a solid powder at room temperature.

The rigid, terminal-modified imide oligomer (IV) preferably comprises 60 to 100 molar %, preferably 80 to 100 molar %, of the recurring units of the formula (Ix); 0 to 40 molar %, more preferably 0 to 20 molar %, of the recurring units of the formula (Iy) and 0 to 20 molar %, more preferably 0 to 10 molar %, of the recurring units of the formula (Iz), and is provided with unsaturated hydrocarbon groups located at the terminals of the oligomer (IV) molecule and imide groups located in an inside portion of the oligomer (IV) molecule.

The rigid imide oligomer (IV) preferably has a degree of imidization of 95% or more, more preferably 96 to 100%, and thus is substantially free from an amide acid bond structure. The imide oligomer (IV) has a logarithmic viscosity number of 0.01 to 0.18, more preferably 0.05 to 0.15, determined in the above-mentioned manner, and can be uniformly dissolved at a concentration of 3% by weight or more, more preferably 5 to 30% by weight, in an organic polar solvent, for example, N-methyl-2-pyrrolidone.

Optionally, the terminal-modified imide oligomer composition of the present invention is in the state of a uniform solution in a concentration of 5 to 50% by weight, preferably 10 to 40% by weight in an organic polar solvent, or is swollen with an organic polar solvent in an amount of 0.01 to 20% by weight, preferably 0.05 to 10% by weight based on the dry weight of the imide oligomer composition.

The organic polar solvents for dissolving or swelling the imide oligomer composition of the present invention are selected from the solvents used as a polymerization medium for the rigid aromatic polyimide (I) or imide macromer (Ia), or the terminal-modified imide oligomer (II) or (IV). The solvents can be selected from, for example, amide compounds, for example, N,N-dimethylformamide, N,N-diethylformamide, N,N-dimethylacetamide, N,N-diethylacetamide, N-methyl-2-pyrrolidone, and N-methylcaprolactum; sulfur-containing compounds, for example, dimethylsulfoxide, hexamethylphosphoramide, dimethylsulfone, tetramethylenesulfone, and dimethyltetramethylenesulfone; phenolic compounds, for example, cresol, and phenol; and another compounds, for example, pyridine, ethylene glycol and tetramethylurea.

The imide oligomer composition of the present invention can be prepared by mixing the above-mentioned aromatic polyimide (I) or the imide macromer (Ia) with the flexible imide oligomer (II), the reactive monomer (III), and optionally, the rigid imide oligomer (IV) in a customary manner, for example, by preparing uniform solutions of the above-mentioned ingredients (I) to (IV) in an organic solvent and mixing the solutions of the ingredients (I) to (IV) altogether, or by heating the ingredients (I) to (IV) to prepare melts of the ingredients, and then mixing the melts of the ingredients (I) to (IV) altogether. Preferably, the method in which the solutions of the ingredients (I) to (IV) in solvents are mixed is preferable for the preparation of the imide oligomer composition of the present invention, because the imide oligomer composition is prepared at a relatively low temperature, for example, room temperature.

The imide oligomer composition of the present invention is useful for producing shaped articles, or laminated articles, for preparing bonding materials or as a matrix resin material for fiber-reinforced composite resin materials.

The imide oligomer composition of the present invention is easily cured by heating at a temperature of 200° C. to 400° C., preferably 220° C. to 350° C., for 0.5 to 30 hours, preferably 1 to 25 hours, to provide cured materials.

The cured materials obtained from the imide oligomer composition of the present invention have a relatively high glass-transition temperature of 350° C. or more, and exhibit a high heat resistance.

EXAMPLES

The present invention will be further explained by the following examples.

In the examples, the logarithmic viscosity number ($\zeta$) of the aromatic polyimide (I) or imide macromer (Ia) or the imide oligomer (II) or (IV), was determined by measuring the viscosity of the solution of the polymer macromer or oligomer in a concentration of 0.5 g/100 ml in a solvent consisting of N-methyl-2-pyrrolidone at a temperature of 30° C., by using a Canon Fenske Viscometer. The logarithmic viscosity number was calculated in accordance with the following equation:

$$\text{Logarithmic viscosity number } (\zeta) = \frac{\ln(V/V_0)}{C}$$

wherein V represent the measured viscosity of the solution, $V_0$ represents a viscosity of the solvent and C represents the concentration of the polymer, macromer or oligomer in the solution.

In the examples, a dynamic viscosity ($\zeta^*$) of the imide oligomer, composition was measured by a cone plate method using a mechanical spectrometer (available under the trademark: RDS-II, from Rheometric Co.) in which method a sample of the imide oligomer composition was placed on a disc having a diameter of 25 mm, and a specific vibration was applied to the sample under a stress of 20% at a frequency of 1 Hz, and the dynamic viscosity ($\zeta^*$) was measured at 150° C.

In the examples, the glass-transition temperature (Tg) of a cured resin material was measured by a glass braid method using the above-mentioned mechanical spectrometer in which method a glass braid having a diameter of 2 mm and a length of 50 mm and impregnated with a sample of an imide oligomer composition was heat-treated (cured) at a temperature of 250° C. for 4 hours, a torsional oscillation was applied to the resultant cured sample under a maximum stress of 0.2% at a frequency of 1 Hz, and a dynamic viscoelasticity of the cured sample was measured. The measurement was repeated twice. A glass-transition temperature (Tg) of the cured sample was determined from a peak temperature of dynamic loss elastic modulus (G'') in a rigidity-temperature curve obtained by the second measurement.

PREPARATION EXAMPLE 1

Preparation of rigid, terminal-modified imide macromer (Ia-1)

A flask with a capacity of one liter was charged with a mixture consisting of (a) 30.893 g of 2,3,3',4'-biphenyltetracarboxylic dianhydride (a-BPDA), (b) 30.893 g of 3,3',4,4'-biphenyltetracarboxylic dianhydride (s-BPDA)

(c) 54.86 g of orthotolidinesulfone (TS), (d) 1.102 g of propargylamine (PA) and (e) 441.0 g of N-methyl-2-pyrrolidone (NMP).

The resultant reaction mixture in the flask was agitated at a temperature of 50° C. for one hour, while flowing a nitrogen gas through the flask, to prepare an amic acid oligomer. Then, the obtained reaction solution was heated to raise the temperation of the solution to 185° C., and maintained at this temperature for 1 hour while agitating, to provide a rigid, terminal-modified imide macromer (Ia-1).

The obtained reaction solution was cooled to a room temperature (about 25° C.), and the cooled solution was poured into water to allow the resultant imide macromer (Ia-1) to deposit in the state of a solid powder. The imide macromer (Ia-1) powder was collected by a filtration. The collected powder was washed twice with methyl alcohol at 25° C., and dried under a reduced pressure. The resultant rigid terminal-modified imide macromer (Ia-1) was in the form of a powder and had an average degree of polymerization of about 20.

Also, the rigid, terminal-modified imide macromer (Ia-1) exhibited the logarithmic viscosity number as shown in Table 1.

PREPARATION EXAMPLE 2

Preparation of a rigid, terminal-modified imide macromer (Ia-2)

The same procedures as in Preparation Example 1 were carried out, with the following exceptions.

The reaction mixture consisted of:

(a) 61.786 g of 2,3,3',4'-biphenyltetracarboxylic dianhydride (a-BPDA), (b) 54.86 g of orthotolidinesulfone (TS)

(c) 1.102 g of propargylamine (PA), and (d) 441.0 g of N-methyl-2-pyrrolidone (NMP).

The resultant rigid, terminal-modified imide macromer (Ia-2) was in the form of a powder, had an average degree of polymerization of about 20, and exhibited the logarithmic viscosity number as shown in Table 1.

PREPARATION EXAMPLE 3

Preparation of a rigid, terminal-modified imide macromer (Ia-3)

The same procedures as in Preparation Example 1 were carried out, with the following exceptions. The reaction mixture consistent of:
(a) 61.786 g of 2,3,3',4'-biphenyltetracarboxylic dianhydride (a-BPDA),
(b) 41.145 g of orthotolidinesulfone (TS)
(c) 14.617 g of 1,3-bis(4-aminophenoxy)benzene (TPE-R)
(d) 1.102 g of propargylamine (PA), and
(e) 472.92 g of N-methyl-2-pyrrolidone (NMP).

The resultant rigid, terminal-modified imide macromer (Ia-3) was in the form of a powder, had an average degree of polymerization of about 20, and exhibited the logarithmic viscosity number as shown in Table 1.

PREPARATION EXAMPLE 4

Preparation of flexible terminal-modified imide oligomer (II-1)

A flask with a capacity of one liter was charged with a mixture consisting of
(a) 117.688 g of 2,3,3',4'-biphenyltetracarboxylic dianhydride (a-BPDA),
(b) 58.468 g of 1,3-bis(4-aminophenoxy)benzene (TPE-R),
(c) 27.430 g of orthotolidinesulfone (TS),
(d) 11.016 g of propargylamine (PA), and
(e) 467.1 g of N-methyl-2-pyrrolidone (NMP).

The resultant reaction mixture in the flask was agitated at a temperature of 50° C. for one hour, while flowing a nitrogen gas through the flask, to prepare an amic acid oligomer. Then, the obtained reaction solution was heated to raise the temperature of the solution to 185° C., and maintained at this temperature for 1 hour while agitating, to provide a flexible, terminal-modified imide oligomer (II-1).

The obtained reaction solution was cooled to a room temperature (about 25° C.), and the cooled solution was poured into water to allow the resultant imide oligomer (II-1) to deposit in the state of a solid powder. The imide oligomer (II-1) powder was collected by a filtration. The collected powder was washed twice with methylalcohol at 25° C., and dried under a reduced pressure. The resultant soft, terminal-modified imide oligomer (II-1) was in the form of a powder and had an average degree of polymerization of about 3.

Also, the flexible, terminal-modified imide oligomer (II-1) exhibited the logarithmic viscosity number as shown in Table 1.

PREPARATION EXAMPLE 5

Preparation of a flexible, terminal-modified imide oligomer (II-2)

The same procedures as in Preparation Example 4 were carried out, with the following exceptions.
The reaction mixture consisted of:
(a) 117.688 g of 2,3,3',4'-biphenyltetracarboxylic dianhydride (a-BPDA).
(b) 87.702 g of 1,3-bis(4-aminophenoxy)benzene (TPE-R)
(c) 11.016 g of propargylamine (PA), and
(d) 467.0 g of N-methyl-2-pyrrolidone (NMP).

The resultant flexible, terminal-modified imide oligomer (II-2) was in the form of a powder, had an average degree of polymerization of about 5, and exhibited the logarithmic viscosity number as shown in Table 1.

PREPARATION EXAMPLE 6

Preparation of a flexible, terminal-modified imide oligomer (II-3)

The same procedures as in Preparation Example 4 were carried out, with the following exceptions.
The reaction mixture consisted of:
(a) 58.844 g of 2,3,3',4'-biphenyltetracarboxylic dianhydride (a-BPDA),
(b) 58.844 g of 3,3',4,4'-biphenyltetracarboxylic dianhydride (s-BPDA),
(c) 58.468 g of 1,3-bis(4-aminophenoxy)benzene (TPE-R),
(d) 27.430 g of orthotolidinesulfone (TS)
(e) 11.016 g of propargylamine (PA), and
(f) 467.0 g of N-methyl-2-pyrrolidone (NMP).

The resultant soft, terminal-modified imide oligomer (II-3) was in the form of a powder, had an average degree of polymerization of about 3, and exhibited the logarithmic viscosity number as shown in Table 1.

PREPARATION EXAMPLE 7

Preparation of a reactive monomer (unsaturated imide compound (III-1)

A flask with a capacity of one liter was charged with a mixture consisting of:
(a) 128.30 g methyl-5-norbornene-2,3-dicarboxylic anhydride,
(b) 39.66 g propargylamine (PA), and
(c) 582.0 g of N-methyl-2-pyrrolidone (NMP).

The resultant reaction mixture in the flask was heated at a temperature of 50° C. for one hour while flowing a nitrogen gas through the flask, to prepare an amic acid oligomer. The resultant reaction solution was heated to raise the temperature thereof to 185° C. and maintained at this temperature for one hour while agitating to provide a reactive monomer an unsaturated imide compound of N-Propargyl methylnadimine (III-1).

The reaction solution was cooled to room temperature (about 25° C.) and the cooled solution was added to water to allow a resultant liquid product to be separated from the solution. The separated liquid product was collected by evaporating water therein and dried under a reduced pressure.

The resultant liquid unsaturated imide compound (III-1) had a molecular weight of 215.

PREPARATION EXAMPLE 8

Preparation of a rigid, terminal-modified imide oligomer (IV-1)

The same procedures as in PREPARATION EXAMPLE 1 were carried out, with the following exceptions.
The reaction mixture consisted of:
(a) 105.92 g of 2,3,3',4'-biphenyltetracarboxylic dianhydride (a-BPDA),
(b) 82.26 g of orthotolidinesulfone (TS)
(c) 6.67 g of propargylamine (PA), and (d) 779.0 g of N-methyl-2-pyrrolidone (NMP).

The resultant rigid, terminal-modified imide oligomer (IV-1) was in the form of a powder, had an average degree of polymerization of about 5, and exhibited the logarithmic viscosity number as shown in Table 1.

PREPARATION EXAMPLE 9

Preparation of a rigid, terminal modified imide oligomer (IV-2)

The same procedures as in Preparation Example 4 were carried out, with the following exceptions.

The reaction mixture consisted of:
(a) 52.96 g of 2,3,3',4'-biphenyltetracarboxylic dianhydride (a-BPDA),
(b) 52.96 g of 3,3',4,4'-biphenyltetracarboxylic dianhydride (sBPDA),
(c) 82.26 g of orthotolidinesulfone (TS)
(d) 6.67 g of propargylamine (PA), and
(e) 779.0 g of N-methyl-2-pyrrolidone (NMP).

The resultant rigid, terminal-modified imide oligomer (IV-2) was in the form of a powder, had an average degree of polymerization of about 5, and exhibited the intrinsic viscosity number as shown in Table 1.

EXAMPLES 1 to 9 and COMPARATIVE EXAMPLES 1 to 5

In each of Examples 1 to 9, a terminal-modified imide oligomer composition was prepared by mixing the rigid, terminal-modified imide macromer (Ia), the flexible, terminal-modified imide oligomer (II), the reactive monomer (III), and the rigid, terminal-modified imide oligomer (IV) of the types as shown in Table 1, in the composition as shown in Table 1, and dissolving the mixture in a solvent consisting of N,N-dimethylacetamide. The resultant composition solution had a total concentration of the mixture of 25% by weight.

In each of Comparative Examples 1 to 5, the above-mentioned compounds (Ia, II, III and IV) of the types as shown in Table 2 were mixed in the composition as shown in Table 2, and the mixture was dissolved in the same solvent as mentioned above. The resultant comparative composition solution had a total concentration of the mixture of 25% by weight.

In each of Examples 1 to 9 and Comparative Examples 1 to 5, the composition solution was impregnated in a glass braid, and dried under a reduced pressure in an oven at a temperature of 80° C. for 8 hours by evaporating away substantially the entire amount of the solvent.

The terminal-modified imide oligomer composition impregnated in the glass braid was subjected to a measurement of a dynamic viscosity ($\zeta^*$) by a cone plate method and to a measurement of a glass-transition temperature (Tg) by a glass braid method.

The test results are shown in Tables 1 and 2.

TABLE 1

| | Composition of terminal-modified imide oligomer composition | | | | | | |
|---|---|---|---|---|---|---|---|
| | Rigid, terminal-modified imide macromer (Ia) | | | Flexible, terminal-modified imide oligomer (II) | | | Reactive monomer (III) |
| Item Example No. | Type | Logarithmic viscosity number ($\zeta$) | Amount (wt part) | Type | Logarithmic viscosity number ($\zeta$) | Amount (wt part) | Type | Amount (wt part) |

| Example | | | | | | | | |
|---|---|---|---|---|---|---|---|---|
| 1 | Ia-1 (P. Ex. 1) | 0.230 | 100 | II-1 (P. Ex. 4) | 0.105 | 131 | III-1 (P. Ex. 7) | 225 |
| 2 | Ia-1 (P. Ex. 1) | 0.230 | 100 | II-2 (P. Ex. 3) | 0.110 | 58 | III-1 (P. Ex. 7) | 138 |
| 3 | Ia-1 (P. Ex. 1) | 0.230 | 100 | II-1 (P. Ex. 4) | 0.105 | 65 | III-1 (P. Ex. 7) | 131 |
| 4 | Ia-1 (P. Ex. 1) | 0.230 | 100 | II-1 (P. Ex. 4) | 0.105 | 30 | III-1 (P. Ex. 7) | 103 |
| 5 | Ia-1 (P. Ex. 1) | 0.230 | 100 | II-3 (P. Ex. 6) | 0.112 | 65 | III-1 (P. Ex. 7) | 131 |
| 6 | Ia-1 (P. Ex. 1) | 0.230 | 100 | II-3 (P. Ex. 6) | 0.112 | 65 | III-1 (P. Ex. 7) | 71 |
| 7 | Ia-1 (P. Ex. 1) | 0.230 | 100 | II-3 (P. Ex. 6) | 0.112 | 53 | III-1 (P. Ex. 7) | 79 |
| 8 | Ia-2 (P. Ex. 2) | 0.228 | 100 | II-1 (P. Ex. 4) | 0.105 | 30 | III-1 (P. Ex. 7) | 103 |
| 9 | Ia-3 (P. Ex. 3) | 0.231 | 100 | II-1 (P. Ex. 4) | 0.105 | 30 | III-1 (P. Ex. 7) | 103 |

| | Composition of terminal-modified imide oligomer composition Rigid, terminal-modified imide oligomer (IV) | | | Dynamic viscosity of composition ($\zeta^*$) (poise) | Glass-transition temperature of cured material (Tg) (°C.) |
|---|---|---|---|---|---|
| Item Example No. | Type | Logarithmic viscosity number ($\zeta$) | Amount (wt part) | | |

| Example | | | | | |
|---|---|---|---|---|---|
| 1 | IV-1 (P. Ex. 8) | 0.130 | 169 | $8.5 \times 10^4$ | 360 |
| 2 | IV-1 (P. Ex. 8) | 0.130 | 88 | $9.2 \times 10^4$ | 367 |
| 3 | IV-1 (P. Ex. 8) | 0.130 | 88 | $9.0 \times 10^4$ | 371 |
| 4 | IV-1 (P. Ex. 8) | 0.130 | 70 | $1.0 \times 10^5$ | 385 |
| 5 | IV-2 | 0.131 | 88 | $9.0 \times 10^4$ | 377 |

TABLE 1-continued

| | | (P. Ex. 9) | | | | |
|---|---|---|---|---|---|---|
| 6 | IV-2 | 0.131 | 88 | $1.5 \times 10^5$ | 365 |
| | (P. Ex. 9) | | | | |
| 7 | — | — | — | $9.7 \times 10^4$ | 377 |
| 8 | IV-1 | 0.130 | 70 | $9.8 \times 10^4$ | 369 |
| | (P. Ex. 8) | | | | |
| 9 | IV-1 | 0.130 | 70 | $9.9 \times 10^4$ | 363 |
| | (P. Ex. 8) | | | | |

Note:
P. Ex. ... Preparation Example No.

TABLE 2

| | Composition of terminal-modified imide oligomer composition | | | | | | | |
|---|---|---|---|---|---|---|---|---|
| | Rigid, terminal-modified imide macromer (Ia) | | | Flexible, terminal-modified imide oligomer (II) | | | Reactive monomer (III) | |
| Item Example No. | Type | Logarithmic viscosity number ($\zeta$) | Amount (wt part) | Type | Logarithmic viscosity number ($\zeta$) | Amount (wt part) | Type | Amount (wt part) |
| Comparative Example | | | | | | | | |
| 1 | — | — | — | II-2 (P. Ex. 5) | 0.110 | 63.0 | III-1 (P. Ex. 7) | 37.0 |
| 2 | — | — | — | II-3 (P. Ex. 6) | 0.112 | 63.0 | III-1 (P. Ex. 7) | 37.0 |
| 3 | Ia-1 (P. Ex. 1) | 0.230 | 60.0 | — | — | — | III-1 (P. Ex. 7) | 40.0 |
| 4 | — | — | — | II-2 (P. Ex. 5) | 0.110 | 25.0 | III-1 (P. Ex. 7) | 43.0 |
| 5 | — | — | — | II-2 (P. Ex. 5) | 0.110 | 44.0 | — | — |

| | Composition of terminal-modified imide oligomer composition Rigid, terminal-modified imide oligomer (IV) | | | Dynamic viscosity of composition ($\zeta^*$) (poise) | Glass-transition temperature of cured material (Tg) (°C.) |
|---|---|---|---|---|---|
| Item Example No. | Type | Logarithmic viscosity number ($\zeta$) | Amount (wt part) | | |
| Comparative Example | | | | | |
| 1 | — | — | — | $1.0 \times 10^3$ | 308 |
| 2 | — | — | — | $1.2 \times 10^3$ | 314 |
| 3 | — | — | — | Could not be measured | >404 |
| 4 | IV-1 (P. Ex. 8) | 0.130 | 32.0 | $4.0 \times 10^2$ | 340 |
| 5 | IV-1 (P. Ex. 8) | 0.130 | 56.0 | Could not be measured | 320 |

As Tables 1 and 2 clearly show, the terminal-modified imide oligomer compositions of Examples 1 to 8 prepared in accordance with the present invention had a relatively high dynamic viscosity ($\zeta^*$) and could be easily cured within a relatively short time and the resultant, and the cured material had a relatively high glass-transition temperature (heat resistance), whereas the compositions of Comparative Examples 1 to 5 had a relatively low dynamic viscosity or too high dynamic viscosity and the resultant cured materials exhibited an undesirably low or too high glass-transition temperature.

We claim:

1. A terminal-modified imide oligomer composition comprising:

(I) 100 parts by weight of a rigid, high molecular weight aromatic polyimide consisting of a polymerization and imidization product of a tetracarboxylic acid component comprising at least one biphenyltetracarboxylic acid compound with an amine component comprising at least one aromatic diamine (a) having at least one cyclic structure and two amino groups directly attached to the cyclic structure, said polyimide (I) having a logarithmic viscosity number of from 0.20 to 1.5 determined in a concentration of 0.5 g/100 ml in a solvent consisting of N-methyl-2-pyrrolidone at a temperature of 30° C.;

(II) 20 to 200 parts by weight of a flexible, terminal-modified imide oligomer consisting of a polymerization and imidization product of a tetracarboxylic acid component comprising at least one biphenyltetracarboxylic acid compound with a diamine component comprising at least one aromatic diamine compound (b) having a plurality of cyclic structures and two amino groups attached directly or through a divalent bonding member to the cyclic structures, and with a monoamine component comprising at least one monoamine compound (c) having a primary amino group and an unsaturated hydrocarbon group, said imide oligomer (II) being provided with unsaturated hydrocarbon groups located at the terminals of the imide oligomer/molecule and imide groups located in an inside portion of the oligomer molecule and having a logarithmic viscosity number of 0.01 to 0.18 determined in the same manner as mentioned above;

(III) 20 to 250 parts by weight of a reactive monomer of a 9,10-bis(phenylethynyl)anthracene, a 5,12-bis(phenylethynyl)naphthacene, a 5-phenyl-2-(2-propynylamino)oxazoline-4-one, a triallylisocyanurate, a diallylphthalate, a N-propargyl phthalimide a N-propargylnadimide, or a N-propargyl methylnadimide; and (IV) 0 to 200 parts by weight of a rigid, terminal-modified imide oligomer consisting of a polymerization and imidization product of a tetracarboxylic acid component comprising at least one biphenyltetracarboxylic acid compound with a diamine component comprising at least one aromatic diamine compound (a) having at least one cyclic structure and two amino groups directly attached to the cyclic structure and with a monoamine component comprising at least one monoamine compound (c) having at least one unsaturated hydrocarbon group, said rigid oligomer (IV) being provided with unsaturated hydrocarbon groups located at the terminals of the oligomer molecule and imide groups located in an inside portion of the oligomer molecule and having a logarithmic viscosity number of 0.01 to 0.18 determined in the same manner as mentioned above.

2. The terminal-modified imide oligomer composition as claimed in claim 1, wherein the rigid, high molecular weight aromatic polyimide (I) is a rigid, terminal-modified imide macromer (Ia) which is a polymerization-imidization product of a tetracarboxylic acid component comprising at least one biphenyltetracarboxylic acid compound with an amine component comprising a diamine sub-component comprising at least one aromatic diamine compound (a) having at least one cyclic structure and at least two amino groups directly attached to the cyclic structure, and a monoamine sub-component comprising at least one monoamine compound (c) having at least one unsaturated hydrocarbon group, said macromer being provided with unsaturated hydrocarbon groups located at the terminals of the macromer molecule and imide groups located in an inside portion of the macromer molecule, and having a logarithmic viscosity number of 0.20 to 1.0 determined in the same manner as mentioned above.

3. The terminal-modified imide oligomer composition as claimed in claim 1, wherein the rigid, high molecular weight aromatic polyimide (I), comprises 60 to 100 molar % of recurring units of the formula (Ix);

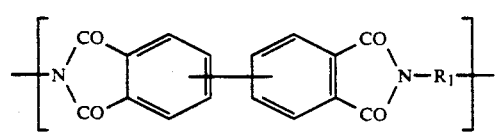

wherein $R_1$ represents a divalent residue of the aromatic diamine compound (a), 0 to 40 molar % of recurring units of the formula (Iy);

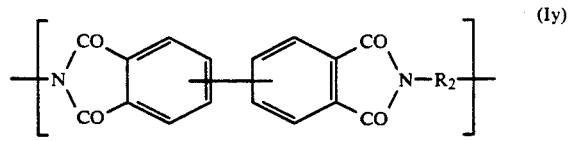

wherein $R_2$ is a divalent residue of the aromatic diamine compound other than the aromatic diamine compound (a) and 0 to 20 molar % of recurring units of the formula (Iz);

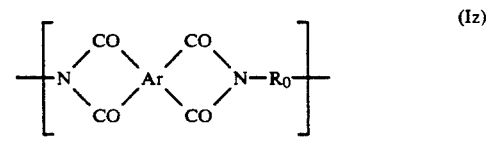

wherein Ar represents a tetravalent residue of an aromatic tetracarboxylic acid compound different from the biphenyltetracarboxylic acid compound and $R_0$ represents a divalent residue of an aromatic diamine compound.

4. The terminal-modified imide oligomer composition as claimed in claim 2, the monoamine subcomponent for the imide macromer (Ia) is used in an amount of 1 to 20 molar % of the molar amount of the tetracarboxylic acid component; the carboxyl equivalent of the tetracarboxylic acid component is approximately equal to the total amino equivalent of the diamine subcomponent and the monoamine sub-component; and the imide macromer (Ia) has a degree of polymerization of the recurring units derived from the tetracarboxylic acid component with the diamine sub-component, of 10 to 100.

5. The terminal-modified imide oligomer composition as claimed in claim 1, wherein the rigid, high molecular weight aromatic polyimide (I) has a melting or softening point of 180° C. to 350° C., and is soluble in a concentration of 3% by weight or more in an organic polar solvent.

6. The terminal-modified imide oligomer composition as claimed in claim 1, wherein the cyclic structure of the aromatic diamine compound (b) is selected from the group consisting of aromatic cyclic hydrocarbon structures and heterocyclic structures.

7. The terminal-modified imide oligomer composition as claimed in claim 1, wherein the diamine component for the flexible, terminal-modified imide oligomer (II) comprises 80 molar % or more of at least one aromatic diamine compound (b).

8. The terminal-modified imide oligomer composition as claimed in claim 1, wherein the flexible, terminal modified oligomer (II) comprises 60 to 100 molar % of at least one member selected from the group consisting of recurring units of the formulae (IIx) and (IIy):

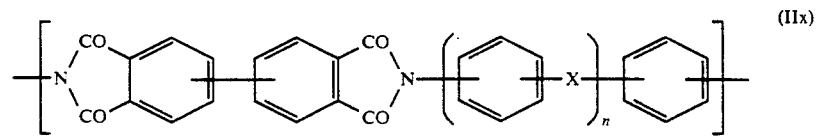

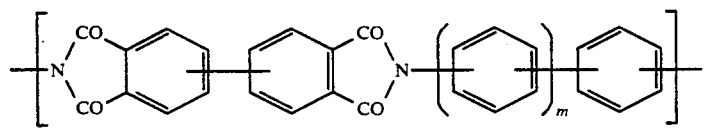

(IIy)

wherein X represents a divalent bonding member selected from the group consisting of —O—, —S—, —SO—, —CO—, —SO$_2$— and —CH$_2$—, n and m respectively and independently from each other represents an integer of 1 to 3, 0 to 40 molar % of recurring units of the formula (IIz);

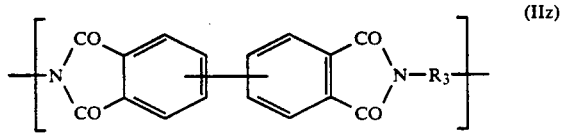

(IIz)

wherein $R_3$ represents a divalent residue of the aromatic diamine compound (b), which is different from

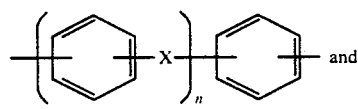 and

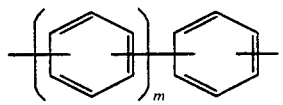

and 0 to 20 molar % of recurring units of the formula (IIw):

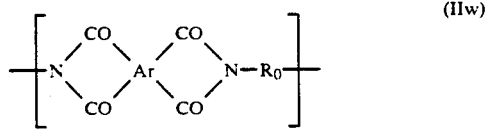

(IIw)

wherein Ar and $R_0$ are as defined above, and is provided with unsaturated terminal hydrocarbon groups derived from the unsaturated hydrocarbon group of the monoamine compound (c), and located at the terminals of the oligomer molecule.

9. The terminal-modified imide oligomer composition as claimed in claim 1, wherein the flexible, terminal-modified imide oligomer (II) has a melting point of 100 to 300° C. and is soluble in a concentration of 3% by weight or more in an organic solvent.

10. The terminal-modified imide oligomer composition as claimed in claim 1, wherein the rigid, terminal-modified imide oligomer (IV) comprises 60 to 100 molar % of the recurring units of the formula (Ix) as defined above, 0 to 40 molar % of the recurring units of the formula (Iy) as defined above, and 0 to 20 molar % of the recurring units of the formula (Iz) as defined above, and is provided with unsaturated hydrocarbon groups located at the terminals of the oligomer (IV) molecule, and imide groups located in an inside portion of the oligomer, (IV) molecule.

11. The terminal-modified imide oligomer composition as claimed in claim 1, wherein the biphenyltetracarboxylic acid compounds for the polyimide (I) and the flexible and rigid imide oligomers (II) and (IV) are selected from the group consisting of 2,3,3',4'-biphenyltetracarboxylic acid, 3,3'4,4'-biphenyltetracarboxylic acid and dianhydrides, lower alkyl esters and salts of the above-mentioned acids.

12. The terminal-modified imide oligomer composition as claimed in claim 1, wherein the diamine compound (a) for the polyimide (I) and the rigid oligomer (IV) is selected from the group consisting of 3,7-diaminodiphenylenesulfone, 2,8-dimethyl-3,7-diaminodiphenylenesulfone and 2,2'-diaminobisthiazole.

13. The terminal-modified imide oligomer composition as claimed in claim 1, wherein the diamine compound (b) for the flexible imide oligomer (II) is selected from the group consisting of benzidine compounds, diamino diphenylether compounds, diamino diphenylmethane compounds, diaminodiphenylsulfone compounds, bis(aminophenyl)benzene compounds, bis[(aminophenoxy)phenyl]propane compounds, bis[(aminophenoxy)phenyl]sulfone compounds, and heterocyclic diamine compounds.

14. The terminal-modified imide oligomer composition as claimed in claim 1 or 2, wherein the monoamine compound (c) for the flexible and rigid imide oligomers (II) and (IV) or for the imide macromer (Ia), is selected from the group consisting of propargylamine (PA), 3-aminobutyne, 5-aminopentyne, 6-aminohexyne, 7-aminoheptyne, 4-amino-3-methylbutyne, 4-aminopentyne, 3-aminophenylacetylene and 4-aminophenyl-acetylene.

* * * * *